Jan. 14, 1969     H. ROBERTS     3,421,175

WINDSHIELD WIPER BLADE

Filed Jan. 29, 1968

INVENTOR.
HARRY ROBERTS
BY Charles Marks

United States Patent Office 3,421,175
Patented Jan. 14, 1969

3,421,175
WINDSHIELD WIPER BLADE
Harry Roberts, 639 Bond Court,
Merrick, N.Y. 11566
Filed Jan. 29, 1968, Ser. No. 701,349
U.S. Cl. 15—250.42        4 Claims
Int. Cl. B60s 1/04; A47l 1/00

ABSTRACT OF THE DISCLOSURE

A windshield wiper blade including a pair of notched flanges which are slidably engageable with brackets provided upon a connector for a pressure distributing member. Said brackets are also depressible to compress a wiper element forming part of the blade, thereby permitting the brackets to avoid the notched flanges and be disengaged from the blade.

BACKGROUND OF THE INVENTION

Field of the invention

This invention relates to an improved windshield wiper blade and is particularly concerned with means for assembling such a blade in conjunction with a connector and pressure distributing member such as is employed in a conventional windshield wiper assembly.

Description of the prior art

Heretofore, a variety of windshield wiper blade assemblies have been employed for wiping flat or curved surfaces of windshields. These assemblies generally include a blade and a pressure distributing device operatively connected to the blade by means of one or more suitable yokes or other suitable connecting devices.

However, these conventional connecting means often involve the use of complex configurations or numerous parts for effecting the required connection to the blade and therefore entail corresponding manufacturing expense.

Summary of the invention

In the present invention, the wiper blade is provided with a flange or flanges which slidably guide the yoke or other connector means to a pair of notches in said flange or flanges, said yoke or other connector means being retained in said notches by the resilient wiper element. The yoke or other connector means is releasable from said notches for purposes of disassembly by compressing the wiper element to permit clearance of said flange or flanges by the yoke or other connector means, whereupon slidable disengagement of the assembled units is permitted. Thus, the present invention solves the problems often presented by conventional equipment by providing an extremely simple but effective means for assembling a wiper blade with a yoke or other connector means of conventional design.

More specifically, it is an object of the present invention to provide an improved windshield wiper blade which may be easily and rapidly assembled with one or more yokes or other connectors to the remaining portions of conventional windshield wiper blade assemblies.

Another object of the invention is to provide such a windshield wiper blade which avoids complex configurations and requires no additional parts for effecting its connection to said yokes or other connectors.

A further object of the invention is to provide a windshield wiper blade having an improved resilient wiper element which cooperates in effecting the aforesaid assembly.

A further object of the invention is to provide a windshield wiper blade of the character described which can be rapidly disassembled from the aforesaid yokes or other connectors.

A further object of the invention is to provide a windshield wiper blade which requires no tools or other equipment and no highly trained personnel to effect its aforesaid assembly and disassembly.

Yet a further object of the invention is to provide a windshield wiper blade of simple, economical and sturdy design.

Other and further objects and advantages of the present invention will become apparent from the following discussion when read in conjunction with the accompanying drawing.

Description of the preferred embodiment

Figure 1:
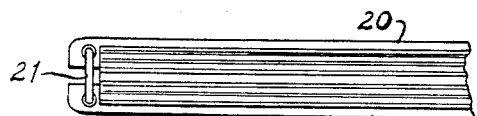
FIG. 1 is a plan view of a windshield wiper blade employed in a preferred embodiment of the invention.
Figure 2:
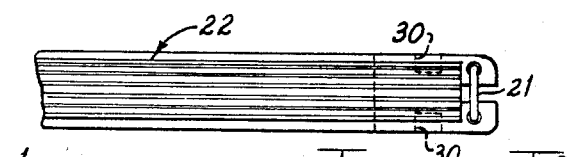
FIG. 2 is an enlarged elevational view of an end portion of said windshield wiper blade taken about the line 2—2 in FIG. 1.
Figure 2:
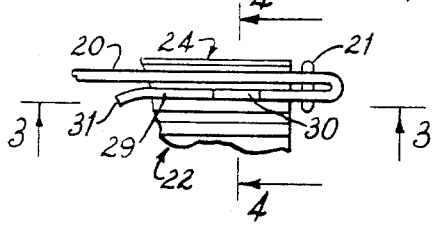
Figure 3:
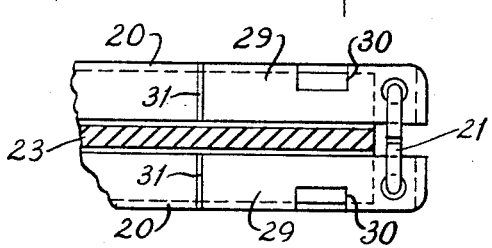
FIG. 3 is a cross-sectional view taken about the line 3—3 in FIG. 2.
Figure 4:
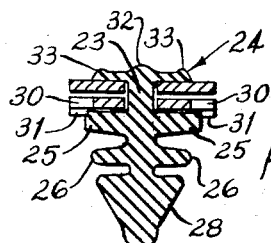
FIG. 4 is a cross-sectional view taken about the line 4—4 in FIG. 2.

As shown in FIGS. 1 to 3 of the drawing, a preferred embodiment of the present invention comprises a windshield wiper blade including a pair of longitudinally extending parallel flat members 20 disposed at a spaced interval with respect to each other and suitable connecting means at the ends thereof such as a pair of links 21. A resilient wiper element, generally designated by the numeral 22 and composed of a flexible rubber or other elastomeric material, includes a web 23 accommodated in said spaced interval between said flat members 20. As shown in FIG. 4, the resilient wiper element 22 also includes an upper flange, generally designated by the numeral 24, intermediate ribs 25, 26 extending transversely of the web 23 and a generally triangular base 28 depending from said web 23.

An important feature of the present invention resides in the flanges 29 which are generally parallel to and depend from, or are formed integrally with, one end portion of each of said flat members 20, said flanges 29 being disposed in close proximity to said flat members 20 and surmounting the intermediate ribs 25. The flanges 29 include oppositely disposed notches 30 which communicate with the outermost parallel edges of said flanges 29. As best seen in FIGS. 2, 3 and 4, the flanges 29 include free end portions 31 inclined generally angularly downwardly with respect to the flat members 20.

It will also be observed that the upper flange 24 of the resilient wiper element 22 includes a ridge 32 disposed intermediately of lateral ridges 33 (see FIG. 4) said ridges 32, 33 extending parallel to each other and to the flat members 20.

Figure 5:
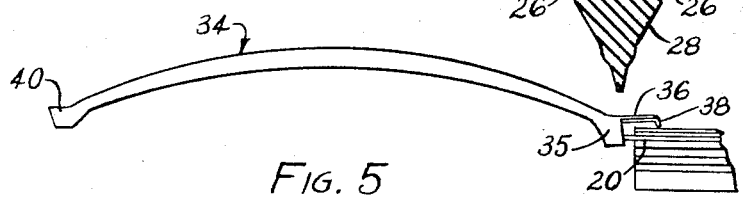
FIGS. 5, 6, 7 and 8 are fragmentary, elevational views depicting various steps in the assembly and disassembly of a yoke with said embodiment of the invention.

The operation of the invention may be best understood by reference to FIGS. 5 to 10 of the drawing, which illustrate the assembly of a conventional yoke with said preferred form of the invention. Thus, as shown in FIG. 5, a yoke generally designated by the numeral 34 and intended for attachment by means well known to those skilled in the art to a suitable pressure distributing element, is provided with a generally inverted U-shaped bracket 35 (see also FIGS. 9 and 10) and a longitudinal extension 36 provided with a depending flange 38.

Figure 9:
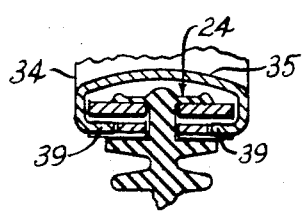
FIG. 9 is a cross-sectional view taken about the line 9—9 in FIG. 7.
Figure 10:
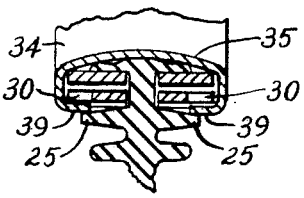
FIG. 10 is a cross-sectional view taken about the line 10—10 in FIG. 8.

As seen in FIGS. 9 and 10, the inverted U-shaped bracket 35 is provided with opposed, inwardly extending flanges 39. A similar bracket 40, but without a longitudinal member such as that designated by the numeral 36, is provided at the left end of the yoke 34, as depicted in FIG. 5.

As shown in FIG. 5, the bracket 35 is engageable with the flat members 20, they being slidably receivable within said bracket 35. Said bracket 35 is slidably disposed between the flat members 20 and the intermediate ribs 25, the bracket 40 also being slidably engageable and accommodated between the flat members 20 and the intermediate webs 25.

Figure 6:
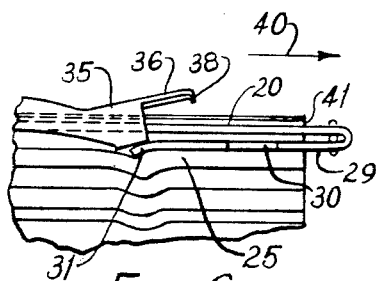

The bracket 35 is contactable with the upper surface of the free end 31 of the flange 29, as shown in FIG. 6, thereby depressing said flange 29 and free end 31 against the yieldable support of the web 25 and permitting the inwardly extending flanges 39 to be slidably disposed between the flanges 29 and the flat members 20.

Figure 7:
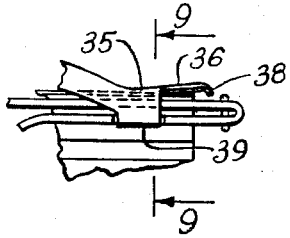

Thereafter, the bracket 35 is moved in the direction of the arrow 40 in FIG. 6 until said bracket is above the notches 30, at which time the flanges 39 are accommodated within said notches 30, as depicted in FIGS. 7 and 9, the flanges 29 being urged upwardly by the ribs 25 which are biased against said flanges 29. In this way, the yoke 34 is locked against further longitudinal movement with respect to the flat members 20 and the resilient wiper element 22.

Longitudinal extension 36 and depending flange 38 also limit movement of said yoke 34, said flange 38 being abuttable against the vertical end face 41 of the resilient wiper element 22.

Removal of the yoke 34 is accomplished by compressing the bracket 35 against the flange 24, thereby urging said flange 24 to flow laterally of the vertical axis thereof, the material of the flange 24 being accommodated in the regions lateral of the original uncompressed ridges 32, 33. Thus, the region bordering upon the ridges 32, 33 and the upper surface of the flange 24 facilitates the "cold flow" of the resilient material of the wiper element, thereby permitting depression of the inwardly extending flanges 39 below the notches 30 and the flanges 29, and depression of the ribs 25 by said flanges 39, as depicted in FIG. 10.

Figure 8:
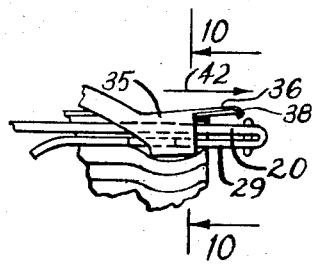

In this position, the bracket 35 may be moved in the direction of the arrow 42 in FIG. 8, thereby disengaging the bracket 35 from the flat members 20 and flanges 29. Engagement with the notches 30 and disengagement therefrom may also be accomplished by the bracket 40, thereby permitting complete disengagement of the yoke 34 from the flat members 20, this engagement and disengagement being capable of accomplishment in a manner similar to that described with respect to the aforesaid engagement and disengagement of the bracket 35.

Thus, it will be seen that the yoke 34 may be rapidly engaged with and disengaged from said flat members 20, as desired.

I claim:

1. In combination with a windshield wiper blade intended for attachment to a yoke connectable to a pressure distributing element, said windshield wiper blade including a pair of flat, spaced apart parallel members, means for connecting said members at the end portions thereof and a resilient wiper element disposed between said flat members;
    (a) a pair of flanges extending parallel to said flat members;
        (i) each of said flanges including an end portion depending from an end portion of one of said flat members;
        (ii) each of said flanges also including a free end portion angularly downwardly inclined with respect to said flat members;
    (b) said pair of flanges including a pair of oppositely disposed notches communicating with the outermost edges of said flanges;
    (c) said yoke including a pair of brackets provided with inwardly extending flanges slidably engageable with said flat members;
    (d) said resilient wiper element including a web, an upper flange and intermediate ribs extending transversely of the web;
    (e) said inwardly extending flanges of the yoke being contactable with the upper surfaces of said downwardly angularly inclined free end portions, thereby depressing against said intermediate ribs the pair of flanges extending parallel to said flat members and permitting said inwardly extending flanges to be disposed above and engaged with said oppositely disposed notches, whereby said yoke is locked against movement parallel to said flat members;
    (f) said inwardly extending flanges of the yoke being depressible from said notches to permit slidable accommodation of said bracket by the end portions of said flat members and the depending end portions of the flanges extending parallel thereto, whereby said yoke is disengageable from said flat members;
    (g) the upper flange of the resilient wiper element being adjacent to a spaced region within said bracket, whereby said upper flange is compressible by said bracket into said spaced region upon said depression of the inwardly extending flanges.

2. In a device according to claim 1:
    (a) said pair of flanges extending parallel to said flat members being formed integrally therewith;
    (b) each of said notches including a generally rectangular indentation in one of said flanges.

3. In a device according to claim 1:
    (a) a pair of said intermediate ribs being surmounted by and biased against the pair of flanges extending parallel to said flat members.

4. In a device according to claim 1:
    (a) the upper flange of said resilient wiper element including a plurality of spaced apart, parallel ridges bordering upon said spaced region.

References Cited

UNITED STATES PATENTS

| 3,132,367 | 5/1964 | Wise | 15—250.42 |
| 3,153,254 | 10/1964 | Lenz et al. | 15—250.42 |
| 3,233,273 | 2/1966 | Anderson | 15—250.42 |

PETER FELDMAN, *Primary Examiner.*